United States Patent [19]

Kunz

[11] Patent Number: 4,758,113
[45] Date of Patent: Jul. 19, 1988

[54] COUPLING FOR WINDING AND UNWINDING MANDRELS OR THE LIKE

[75] Inventor: Wolfgang Kunz, Lörrach, Fed. Rep. of Germany

[73] Assignee: Kunz Maschinen- und Apparatebau GmbH, Lörrach-Hauingen, Fed. Rep. of Germany

[21] Appl. No.: 14,938

[22] Filed: Feb. 13, 1987

[30] Foreign Application Priority Data

Feb. 14, 1986 [DE] Fed. Rep. of Germany ....... 3604611

[51] Int. Cl.$^4$ .............................................. F16D 1/00
[52] U.S. Cl. .................................. 403/341; 403/286; 464/182; 242/68.4
[58] Field of Search ................. 403/26, 341, 354, 355, 403/353, 286; 464/106, 182, 185; 242/68.4, 68.1

[56] References Cited

U.S. PATENT DOCUMENTS

| | | | |
|---|---|---|---|
| 3,147,985 | 9/1964 | Horenberger et al. | 242/68 X |
| 3,368,769 | 2/1968 | Obenshain | 242/68.4 |
| 4,344,304 | 8/1982 | Eiche | 464/85 |
| 4,460,134 | 7/1984 | Kunz | 242/68.4 |
| 4,551,117 | 11/1985 | Kunz | 403/353 X |

FOREIGN PATENT DOCUMENTS 917592 9/1954 Fed. Rep. of Germany .
3127553 11/1983 Fed. Rep. of Germany .
2932895 4/1984 Fed. Rep. of Germany .

Primary Examiner—Andrew V. Kundrat
Attorney, Agent, or Firm—Peter K. Kontler

[57] ABSTRACT

A coupling between a motor-driven shaft and a mandrel for winding or unwinding reels has a recess provided in the end portion of the shaft and serving to receive the end portion of the mandrel. The end portion of the shaft has a wheel which is pivotable between an inoperative position to permit insertion of the end portion of the mandrel into the recess and an operative position in which the end portion of the mandrel is confined in the recess. The end portion of the mandrel has a non-circular peripheral surface which is surrounded by the complementary surface of the end portion of the shaft when the end portion of the mandrel is properly inserted into the recess and the wheel is held in the operative position. In order to ensure that the shaft can drive the mandrel, even if the wheel is held in the inoperative position and/or during starting of the mandrel, the bottom face of the end portion of the shaft in the recess or the end face of the end portion of the mandrel has a pivotable tongue or a reciprocable pin which is biased into a complementary groove or hole in the end face of the end portion of the mandrel or in the bottom face in the recess as soon as the mandrel is properly inserted into that part of the recess which is provided in the non-pivotable section of the end portion of the shaft.

29 Claims, 8 Drawing Sheets

COUPLING FOR WINDING AND UNWINDING MANDRELS OR THE LIKE

CROSS-REFERENCE TO RELATED CASES

The coupling of the present invention can be used in apparatus of the type disclosed in commonly owned U.S. Pat. No. 4,460,134 granted July 17, 1984 to Udo Kunz and is similar to that which is disclosed in the commonly owned U.S. Pat. No. 4,344,304 granted Aug. 17, 1982 to Hans Eiche.

BACKGROUND OF THE INVENTION

The invention relates to couplings for winding and unwinding mandrels and like rotary driven members. More particularly, the invention relates to improvements in couplings of the type wherein the connection between a rotary driving member (such as a motor-driven shaft) and a rotary driven member (such as a mandrel) can be interrupted by pivoting a first section of the end portion of the driving member relative to a second section in order to allow for sidewise extraction of the end portion of the driven member from a recess in the end portion of the driving member.

A coupling of the just outlined character is disclosed, for example, in the aforementioned U.S. Pat. No. 4,344,304 as well as in German Pat. No. 917,592. The German patent discloses a coupling wherein the square end portion of a rotary mandrel is receivable in a complementary recess in the end portion of the driving member. The end portion of the driving member has a pivotable hand wheel which can be moved between an inoperative position, wherein the hand wheel permits insertion of the end portion of the mandrel into the recess, and an operative position in which the driving member is ready to transmit torque to the mandrel. The configuration of the end portion of the driving member is such that the hand wheel is compelled to automatically assume its operative position when the end portion of the mandrel extends into the recess and the motor for the driving member is started so that the driving member begins to transmit torque to the mandrel by way of surfaces surrounding the recess in the end portion of the driving member. Before the hand wheel is pivoted to its operative position, three facets on the end portion of the mandrel are adjacent to three complementary surfaces in the recess of the end portion of the driving member. The surface surrounding the recess is circumferentially complete when the hand wheel is pivoted back to its operative position. In other words, the fourth facet of the end portion of the mandrel is engaged by a complementary facet of the driving member in response to pivoting of the hand wheel to its operative position.

A drawback of the patented coupling is that the mandrel must be absolutely parallel to the driving member during introduction of the end portion of the mandrel into that part of the recess which is defined by the non-pivotable section of the end portion of the driving member. This cannot be readily achieved when the patented coupling is one of two couplings which are provided at opposite axial ends of a driven member in the form of a mandrel having a length of between one and three meters. At such time, it is necessary to employ two workers one of whom monitors the introduction of one end portion of the mandrel into the recess of the first coupling while the other worker monitors the introduction of the other end portion of the mandrel into the recess of the second coupling. If the two couplings are constructed and assembled with a reasonably high degree of precision, such simultaneous introduction of both end portions of the mandrel into the recesses of the respective discrete couplings is practically impossible. Nevertheless, such couplings are in use because they exhibit the advantage that the hand wheels at both axial ends of the mandrel are reliably pivoted to their operative positions in response to starting of the respective driving members.

U.S. Pat. No. 3,147,985 to Hornberger et al. discloses a driving chuck wherein the square end portion of a driven spindle is received in the recess of the end portion of a rotary driving member in response to shifting of a slip ring axially of the end portion of the driving member to a retracted position. Once the end portion of the spindle is properly inserted in that portion of the recess which is defined by the end portion of the driving member, the slip ring is pushed back axially of the driving member to assume an operative position in which it cooperates with the end portion of the driving member to define a recess bounded by a circumferentially complete internal surface which is capable of transmitting torque to the faceted peripheral surface of the end portion of the spindle. The end portion of the driving member defines a first portion of the recess, and such first portion is bounded by two internal surfaces which make an angle of approximately 90 degrees and abut two complementary facets of the end portion of the spindle when the latter is properly inserted into the recess in retracted position of the slip ring. The just described configuration of the recess in the end portion of the driving member is desirable and advantageous because the end portion of the spindle is automatically centered in the first portion of the recess before the slip ring is shifted back to its operative position.

A similar coupling for transmission of torque between a rotary driving member and a rotary driven member is disclosed in German Pat. No. 29 32 895 wherein the end portion of the driven member has a substantially triangular cross-sectional outline. The end portion of the driving member has a recess surrounded by a substantially V-shaped surface which must be oriented in such a way that the apex of the V is located at the lowermost point of the recess when the end portion of the driven member is ready for insertion into the recess. Such construction ensures that the end portion of the driven member can be properly received in the recess of the end portion of the driving member, even if the surfaces bounding the end portion of the driven member and the recess are not machined with a high degree of precision. Thus, the end portion of the driven member automatically finds its way into the recess even if the recess is bounded by surfaces which are not exactly complementary to the corresponding surfaces of the end portion of the driven member. Therefore, the end portion of the driven member can be inserted into the recess or extracted from the recess by an automatic mechanism. This is particularly desirable when the driven member is a mandrel which is to carry one or more reels for collection or for paying out of elongated webs, strips or ropes of filamentary or other material. As mentioned before, the manipulation of certain presently known elongated mandrels for winding up or paying out of such elongated web or rope-shaped materials necessitates the presence of two workers.

The couplings which are disclosed by Hornberger et al. and in the just discussed German Pat. No. 29 32 895 exhibit the drawback that the transmission of torque from the driving member to the driven member is possible only when the pivotable, reciprocable or otherwise movable section of the end portion of the driving member is moved to operative position. With reference to the coupling of Hornberger et al., this means that the driving member can transmit torque to the driven member only when the two-piece slip ring is returned from its retracted to its operative position so that the slip ring defines a portion of the surface surrounding the peripheral surface of the end portion of the driven member. If the slip ring is not returned to its operative position when the driving member is set in rotary motion, the end portion of the driven member is likely to be expelled from that portion of the recess which is defined by the end portion of the driving member. The thus displaced or shifted end portion of the driven member prevents the movement of the slip ring back to its operative position and is likely to cause a lengthy interruption of operation of the winding or unwinding apparatus. Moreover, if the driving member is set in rotary motion before the slip ring returns to its operative position, the improperly inserted end portion of the driven member can cause extensive damage to the coupling as well as to other component parts of the apparatus in which the patented coupling is put to use.

An attempt to overcome the drawbacks of the couplings of Hornberger et al. and German Pat. No. 29 32 895 is disclosed in German Pat. No. 31 27 553. The patented coupling is provided with a mechanism which moves the pivotable hand wheel to its operative position before the driven member can receive torque from the driving member. The arrangement is such that the end portion of the driven member cannot be expelled from or shifted relative to the recess in the non-movable end portion of the driving member before the hand wheel reassumes its operative position. A drawback of this patented proposal is that the means for monitoring the position of the hand wheel and for moving the hand wheel to its operative position in automatic response to starting of the driving member is expensive and occupies an excessive amount of space.

The danger of failure of a conventional coupling is particularly pronounced if the end portion of the driven member is surrounded, either in part or entirely, by circular or convex surfaces. The totality of such surfaces can form a substantially conical surface which has an outline resembling the outline of the internal surface in the recess in the end portion of the driving member. At such time, the transmission of torque takes place by way of a single flat or by way of two or more relatively small facets forming part of the peripheral surface of the end portion of the driven member and the internal surface bounding the recess in the end portion of the driving member.

OBJECTS AND SUMMARY OF THE INVENTION

An object of the invention is to provide a coupling which is constructed and assembled in such a way that the end portion of the driven member can be readily separated from the end portion of the driving member with little loss in time but the driving element can drive the driven member as soon as the end portion of the driven member is properly aligned with the end portion of the driving member, regardless of whether or not the end portion of the driven member is actually locked in such position of axial alignment with the driving member.

Another object of the invention is to provide a coupling of the just outlined character wherein the end portion of the driven member is automatically centered and is held in proper position of axial alignment with the end portion of the driving member even before the movable section of the end portion of the driving member is moved to its operative position.

A further object of the invention is to provide the coupling with novel and improved means for transmitting torque to the driven member independently of the torque transmitting means which is operative when the engagement of the coupling is completed.

Still another object of the invention is to provide a coupling which is constructed and assembled in such a way that the end portion of the driven member cannot be shifted relative to the end portion of the driving member, even if the coupling is not closed or fully engaged before the driving member is set in rotary motion.

A further object of the invention is to provide a coupling of the above outlined character which need not be provided with automatic means for closing the coupling before the driving member is set in rotary motion.

Still another object of the invention is to provide a novel and improved coupling for transmission of torque between the output shaft of a motor and a mandrel which carries one or more winding or unwinding reels for elongated web, strip of cord stock.

A further object of the invention is to provide a novel and improved coupling which is constructed and assembled in such a way that the end portion of the driven member can receive torque from the driving member even if the end portion of the driven member is not locked in a position of exact coaxiality with the driving member.

Another object of the invention is to provide a coupling which ensures that the end portion of the driven member is automatically centered relative to the end portion of the driving member not much later than at the time the driving member transmits torque to the driven member.

A further object of the invention is to provide a coupling which has plural torque transmitting means between the driving and driven members.

Still another object of the invention is to provide a coupling which can be used in conventional apparatus for winding or unwinding webs, strips, ropes or cords of flexible material.

Still another object of the invention is to provide a coupling which can be obtained by conversion of a conventional coupling in a simple and time- and material-saving manner.

A further object of the invention is to provide a novel and improved method of transmitting torque between driving and driven members even before the driven member is properly locked in a position of exact axial alignment with the driving member.

Another object of the invention is to provide a coupling wherein the driven member can be moved to and from a position of axial alignment with the driving member by automatic means.

An additional object of the invention is to provide a coupling which can be properly engaged or disengaged without any supervision on the part of one or more attendants.

A further object of the invention is to provide a simple, compact and inexpensive coupling which can transmit a substantial torque as soon as the driven member is moved to a position of axial alignment with the driving member regardless of whether or not the driven member is securely locked in such position.

The invention is embodied in a coupling which comprises a rotary driving member (such as a motor-driven shaft) having a first end portion, and a rotary driven member having a second end portion. The driven member can constitute a mandrel which carries or can carry one or more reels for winding or unwinding of filamentary, web-shaped or like material. One of the end portions has first and second sections, and the first section (for example, a hand wheel) is movable relative to the second section between a first position in which the first and second sections respectively define first and second parts of a recess, and a second position in which the second part of the recess is accessible at one side of the one end portion. The other end portion is insertable into and is removable from the second part of the recess at the one side of the one portion in the second position of the first section. The other end portion has a noncircular peripheral surface, and the one end portion has a substantially complementary internal surface which surrounds the recess in the first position of the first section so that the driving member can rotate the driven member by way of the peripheral surface and the complementary internal surface. The coupling further comprises means for transmitting torque between the end portions of the driving and driven members independently of the peripheral and internal surfaces and irrespective of the position of the first section as long as the other end portion is inserted into the second part of the recess. In other words, the aforementioned hand wheel can assume its operative (first) or inoperative (second) position while the driving member rotates the driven member, as long as the other end portion is received in that section of the end portion of the driving member which does not change its position.

In accordance with a presently preferred embodiment of the invention, the torque transmitting means comprises a first component which is disposed in the region of the end face of the other end portion, and a second component which is provided in the region of the bottom face in the recess of the one end portion. The bottom face is preferably provided on the second section of the one end portion.

The torque transmitting means comprises a female component in one of the faces and a male component which extends beyond the other face and into the female component when the other end portion is received in the second part of the recess. The female component can be provided with a groove which extends substantially radially of the respective end portion, and the male component can comprise a tongue which is received in the groove when the other end portion is properly received in the second part of the recess. The groove is preferably provided with an open end at the one side of the one end portion, and the tongue is preferably eccentric with reference to the respective end portion.

The term "tongue" is intended to denote a rounded, elongated, strip-shaped or cylindrical male component, and the term "groove" is intended to denote a recess, a hole, a bore or any other space capable of receiving the corresponding male component.

The groove of the female component can be provided in the end face of the other end portion, and the tongue of the male component is then provided on the one end portion and extends beyond the bottom face in the recess and into the groove when the other end portion is received in the second part of the recess. The peripheral surface of the other end portion can be provided with two mutually inclined facets defining an edge, and being received in the second part of the recess. The groove has an open end in the region of such edge.

If desired, the groove of the female component can be provided in the bottom face of the one end portion, and the male component then preferably comprises a tongue which extends beyond the end face of the other end portion and into the groove when the other end portion is received in the second part of the recess. The peripheral surface of such end portion can be provided with a flat and with a substantially cylindrical portion, and the open end of the groove in the bottom face is preferably provided at the one side of the one end portion so a to permit insertion of the tongue while the other end portion is being introduced into the second part of the recess from the one side of the one end portion. Such one side can constitute the upper side of the one end portion. The tongue is preferably eccentric with reference to the other end portion.

The female component can comprise at least one elongated groove which extends across the entire end face of the other end portion and has two open ends. In accordance with a presently preferred embodiment, the female component has a plurality of intersecting grooves in the end face of the other end portion. The peripheral surface of such other end portion can be provided with a plurality of facets defining a plurality of edges, and each groove has an open end in the region of a different edge. For example, the end face of the other end portion can have a substantially square outline which is bounded by four facets and four edges. The female component of the torque transmitting means in such coupling can have two grooves which extend diagonally of the end face and each of which has two open ends.

The arrangement is preferably such that the male component at least substantially fills the female component when the other end portion is received in the second part of the recess.

In accordance with a further feature of the invention, the coupling can comprise means for movably mounting the male component in the respective end portion so that the male component can yield during insertion of the other end portion into the second part of the recess if the other end portion is not inserted in a predetermined direction. Means can be provided for biasing the male component into the female component when the other end portion is properly received in the second part of the recess. The mounting means can comprise a pivot member which extends substantially transversely of the axis of the respective end portion (which supports the pivot member), and the biasing means can comprise at least one resilient element (for example, a coil spring) which reacts against the respective end portion and bears against the male component. The axis of the pivot member can intersect or can be closely adjacent the axis of the respective end portion.

The male component which is movably mounted in the respective end portion can be provided with a ramp which slopes in a direction away from the one side of the one end portion and is acted upon by the other end portion during insertion of the other end portion into the second part of the recess when the direction of insertion of the other end portion deviates from a predetermined direction.

The mounting means can comprise at least one ball and socket joint, and the end portion in which the male component is movably mounted can comprise guide means which confines the male component to movements along a predetermined path. The ball and socket joint can comprise two rivet heads on the male component and two complementary sockets in the respective end portion.

The male component can be reciprocably guided in the respective end portion eccentrically of such end portion, and the biasing means can comprise means for urging the male component into the female component when the other end portion is received in the second part of the recess.

Such male component can be provided with a rounded or bevelled or otherwise sloping tip which penetrates into the female component in response to proper insertion of the other end portion into the second part of the recess. Such coupling can further comprise means for limiting the extent of reciprocability of the male component relative to the respective end portion. Such male component can be provided with an elongated slot, and the limiting means can comprise a projection or protuberance (for example, a pin) provided on the respective end portion and extending into the slot.

The male component of the just described coupling is preferably remote from the axis of the respective end portion and from the one side of the one end portion when the other end portion extends into and is properly received in the second part of the recess. The other face of such coupling is preferably provided with a hole (for example, in the form of a blind bore) for the male component. The hole is preferably at least substantially parallel to the axis of the respective end portion.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
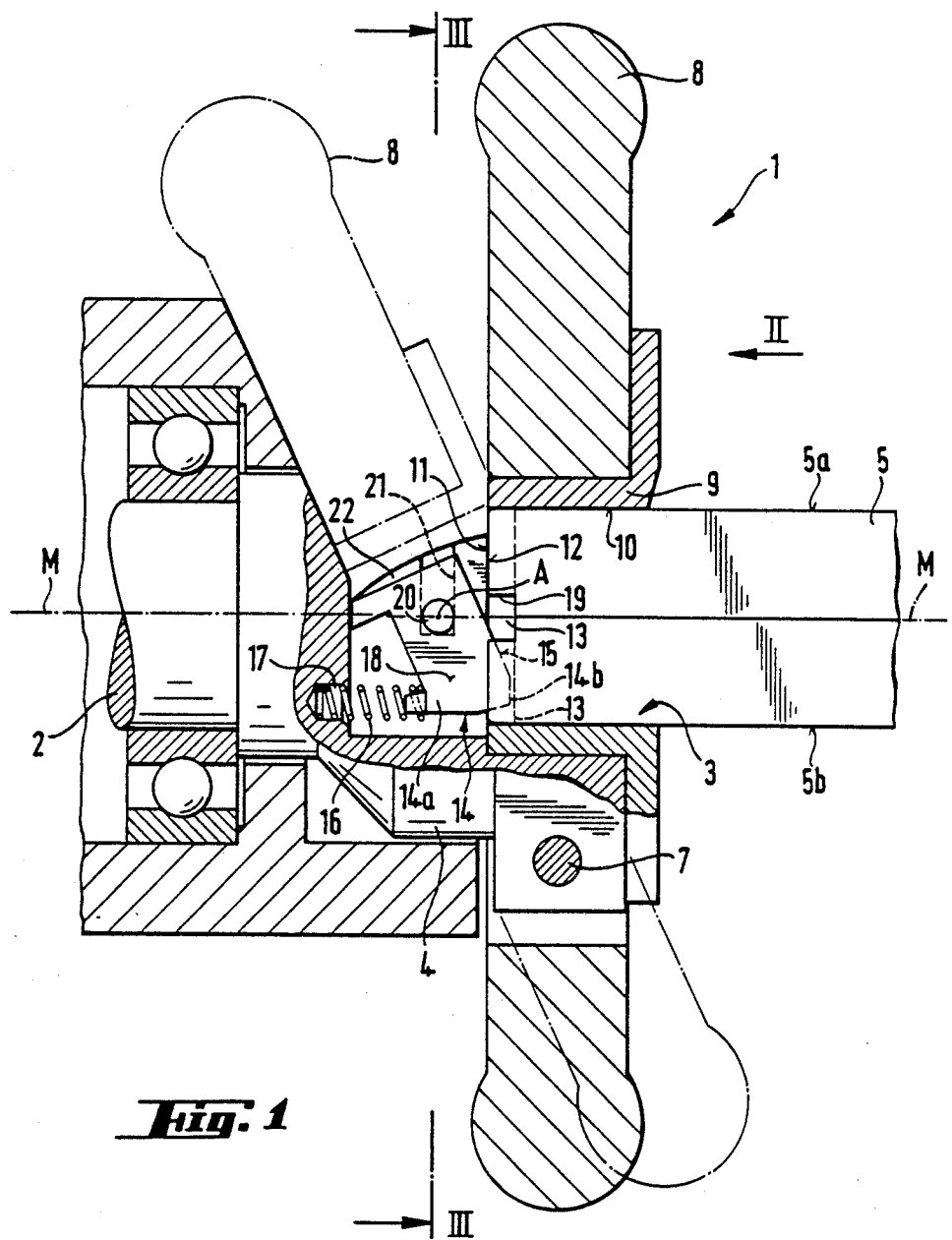
FIG. 1 is a fragmentary elevational and partly sectional view of a coupling which embodies one form of the invention, the first position of the first section of the end portion of the driving member being shown by solid lines and its second position by phantom lines, the section being taken in the direction of arrows as seen from the line I—I of FIG. 2.

Referring first to FIGS. 1-4, there is shown a coupling 1 which can be used to drive a rotary driven member 5, such as a mandrel which can have a length of 1-3 meters and can carry one or more reels or spools (not shown) for supplies of strip-, web- or cord-shaped material which is to be convoluted onto or paid out by the core or cores of the reel or reels. The coupling 1 comprises a rotary driving member 2 which can constitute the output shaft of an electric motor, not shown, and has a composite end portion including a first section in the form of a hand wheel 8 and a second section 4 in the form of a socket which is rigid or integral with the main portion of the shaft 2. When the hand wheel 8 is maintained in the operative or first position which is shown in FIG. 1 by solid lines, the sections 4 and 8 of the end portion of the shaft 2 define a composite recess 3 having a first part defined by the hand wheel 8 and a second part defined by the socket 4. The first part of the recess 3 is actually defined by a suitably configurated retaining element 9 which forms part of or is rigidly connected to the hand wheel 8. The latter is pivotable relative to the socket 4 about the axis of a pivot member 17 which is remote from the common axis M—M of the end portions 8, 4 and 5A of the shaft 2 and mandrel 5 when the mandrel is properly received in the composite recess and the hand wheel 8 is held in the operative or first position of FIG. 1. The second or inoperative position of the hand wheel 8 is shown in FIG. 1 by phantom lines. When the hand wheel assumes the phantom-line position, a portion of the recess 3 is accessible from above, as seen in FIG. 1, i.e., from the upper side of the end portion of the shaft 2. The arrangement is normally such that the end portion of the shaft 2 is held in the position of FIG. 1 (in which the axis of the pivot member 7 is horizontal) before the end portion 5A of the mandrel 5 is inserted into or withdrawn from that part of the recess 3 which is defined by the hand wheel 8.

Figure 2:
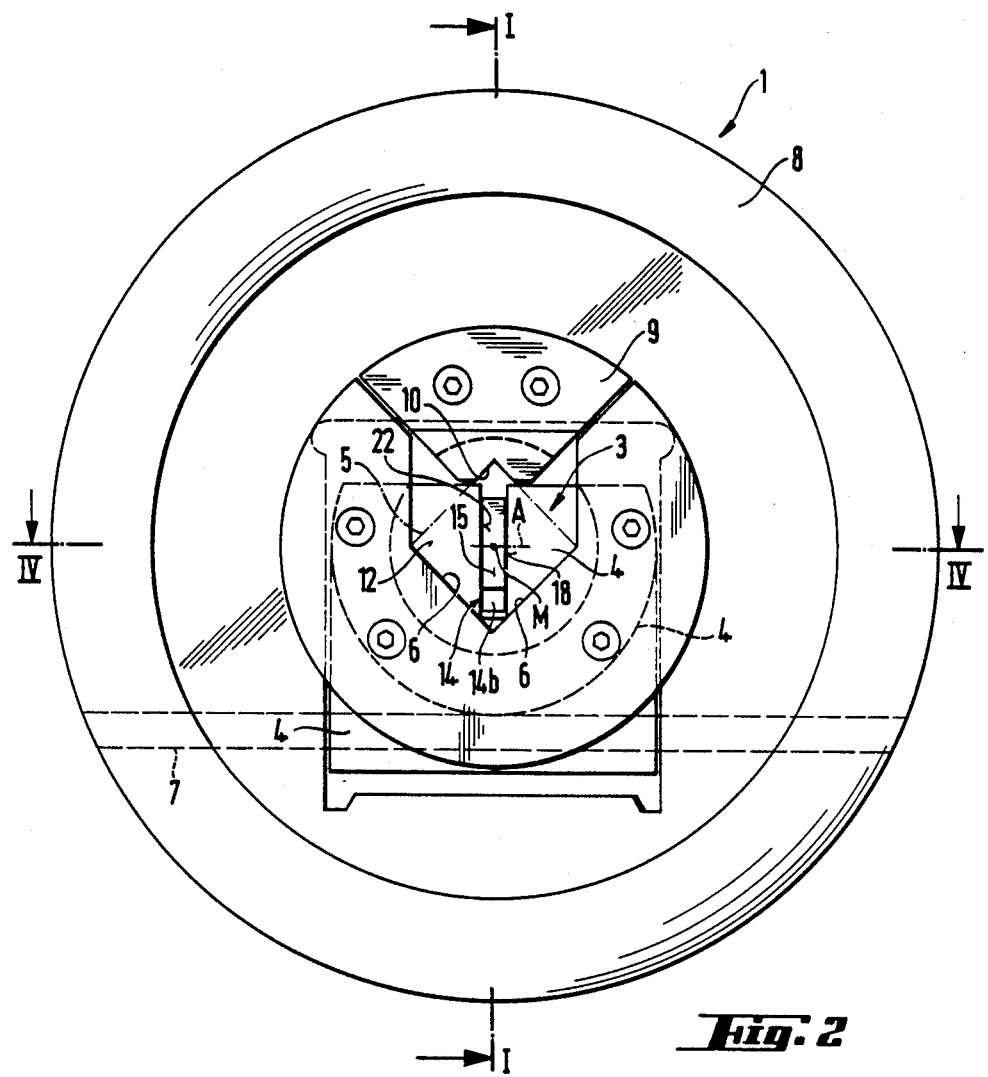
FIG. 2 is a first smaller-scale transverse sectional view of the coupling which is shown in FIG. 1.

In the embodiment of FIGS. 1-4, the end portion 5A of the mandrel 5 has a square cross-sectional outline. In other words, the peripheral surface of the end portion 5A is composed of four facets 5c which define four axially parallel edges two of which are shown at 5a and 5b. The recess 3 is bounded by a complementary internal surface of the end portion 8, 4 of the shaft 2. As shown in FIG. 2, the recess 3 is bounded by two internal surface portions 6 of the socket 4 and two internal surface portions 10 of the retaining element 9 on of the hand wheel 8 when the hand wheel assumes the solid-line position of FIG. 1. The surface portions 6 make an angle of 90 degrees, the same as the surface portions 10. The apex of the angle which is defined by the surface portions 6 is located at the deepmost point of that part of the recess 3 which is defined by the socket 4 when the just mentioned part of the recess is ready to receive a part of the end portion 5A of the mandrel 5. This ensures that the end portion 5A automatically finds its way into that part of the recess 3 which is defined by the socket 4 when the shaft 2 is idle and its end portion 8+4 is ready to receive the end portion 5A. The manner in which the mandrel 5 can be lifted or lowered by a crane or by any other automatic or semiautomatic lifting and lowering mechanism forms no part of the present invention. As explained above, the arrangement is preferably such that the orientation of the mandrel 5 is not changed during insertion into or during extraction of its end portion 5A from the part of that recess 3 which is defined by the socket 4 when the shaft 2 is idle. The surface portions 6 flank the edge 5b of the end portion 5A when the insertion of such end portion into the socket 4 is completed. When the pivoting of the hand wheel 8 to its operative position of FIG. 1 is completed, the surface portions 10 of the retaining element 9 of the hand wheel 8 flank the edge 5a of the end portion 5A. If the shaft 2 is thereupon set into rotary motion, the surface portions 6 and 10 form a nearly complete or complete internal surface which surrounds the composite recess 3 and transmit torque to the peripheral surface (including the four facets 5c) of the end portion 5A of the mandrel 5. It goes without saying that the configuration of the retaining element 9 on the hand wheel 8 must be such that the hand wheel can be pivoted about the axis of the pivot member 7 between the solid-line and phantom-line positions of FIG. 1.

Figure 3:
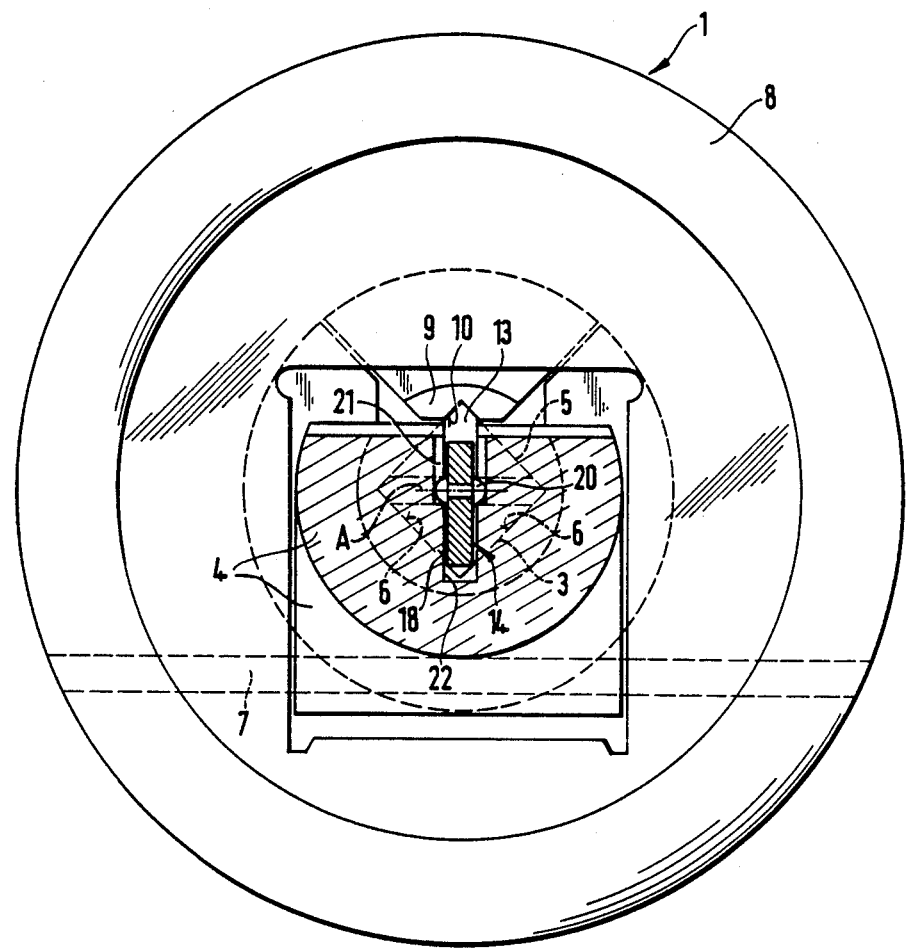
FIG. 3 is a second smaller-scale transverse sectional view of the coupling which is shown in FIG. 1.

In the absence of any undertaking to the contrary, the end portion 5A of the mandrel 5 would be likely to tend to move upwardly, as seen in FIG. 1, 2 or 3, so as to move its two lower facets 5c out of contact with the surface portions 6 of the socket 4 (i.e., of the second (fixed) section of the end portion of the shaft 2) if the shaft 2 were set in rotary motion before the hand wheel 8 is pivoted from the phantom-line position to the solid-line position of FIG. 1. In other words, the surface portions 6 of the socket 4 could tend to move the end portion 5A of the mandrel 5 upwardly, as seen in FIG. 1 or 2, and to thereby cause extensive damage to the apparatus in which the coupling 1 is installed and/or a delay in the operation of apparatus because the shaft 2 would be unable to properly rotate the mandrel 5 about a preselected axis (M—M). In accordance with the invention, the improved coupling 1 comprises means for transmitting torque from the shaft 2 to the mandrel 5 independently of the surface portions 6, 10 on the sections 4, 8 of the end portion of the shaft 2 and independently of the facets (surface portions) 5c of the peripheral surface of the end portion 5A of the mandrel 5. In other words, the torque transmitting means can rotate the mandrel 5 independently of the portions 6 and 10 of the surface bounding a complete recess 3 in the operative position of the hand wheel 8. The improved torque transmitting means transmits torque in such a way that the end portion 5A is not lifted out of the space between the mutually inclined surface portions 6 if the shaft 2 is started before the hand wheel 8 is moved from the phantom-line position to the solid-line position of FIG. 1.

Figure 8:
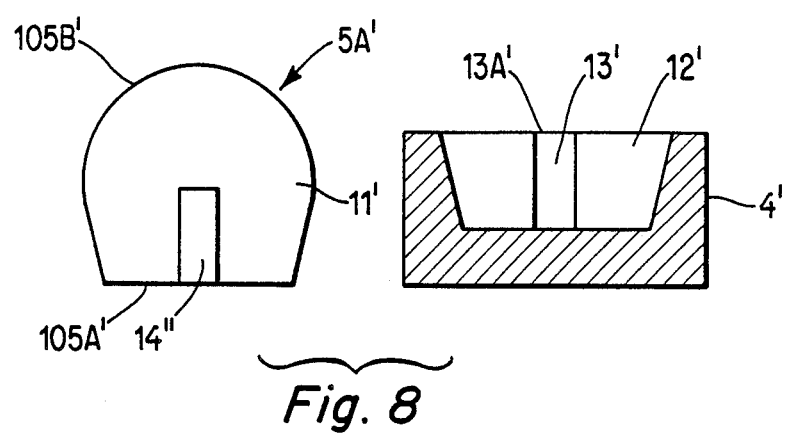
FIG. 8 is an end elevational view of the end portion of the driven member and a transverse sectional view of the second section of the end portion of the driving member in a fourth coupling.

The torque transmitting means comprises a female component which can include a recess, a bore or a hole in the end face 11 of the end portion 5A and a male component 14 (such as a tongue) which normally projects or extends beyond the bottom face 12 in the composite recess 3 of the end portion 8, 4 of the shaft 2. As shown in FIG. 8, it is also possible to reverse the positions of the male and female components of the torque transmitting means. The arrangement is preferably such that the male component fills the groove, hole or bore of the female component as soon as the end portion 5A of the mandrel 5 is properly inserted into that part of the recess 3 which is defined by the socket 4 (non-pivotable section) of the end portion of the shaft 2.

In the embodiment of FIGS. 1-4, the female component of the torque transmitting means comprises an elongated groove 13 which is machined into or is otherwise formed in the end face 11 of the end portion 5A and has two open ends, namely a first open end in the region of the edge 5a and a second open end in the region of the edge 5b. That open end of the groove 13 which is disposed in the region of the edge 5a faces upwardly when the part of the recess 3 which is defined by the socket 4 is ready to receive the corresponding part of the end portion 5A of the mandrel 5, i.e., when the aforementioned side of the end portion of the shaft 2 faces upwardly. The male component 14 of the torque transmitting means is pivotable and is mounted on the socket 4; it has a portion 15 resembling a ramp which slopes downwardly and to the right, as seen in FIG. 1, when the part of the recess 3 which is defined by the socket 4 is ready to receive the corresponding part of the end portion 5A. The male component 14 is pivotable about the axis A of a pivot member 20, and such axis intersects or is close to the axis M—M of the shaft 2. The axis A of the pivot member 20 is parallel to the axis of the pivot member 7 for the hand wheel 8. The male component 14 is eccentric with reference to the end portion of the shaft 2 so that it can reliably transmit torque from the shaft 2 to the mandrel 5 at a location which is remote from the axis M—M.

Figure 7:
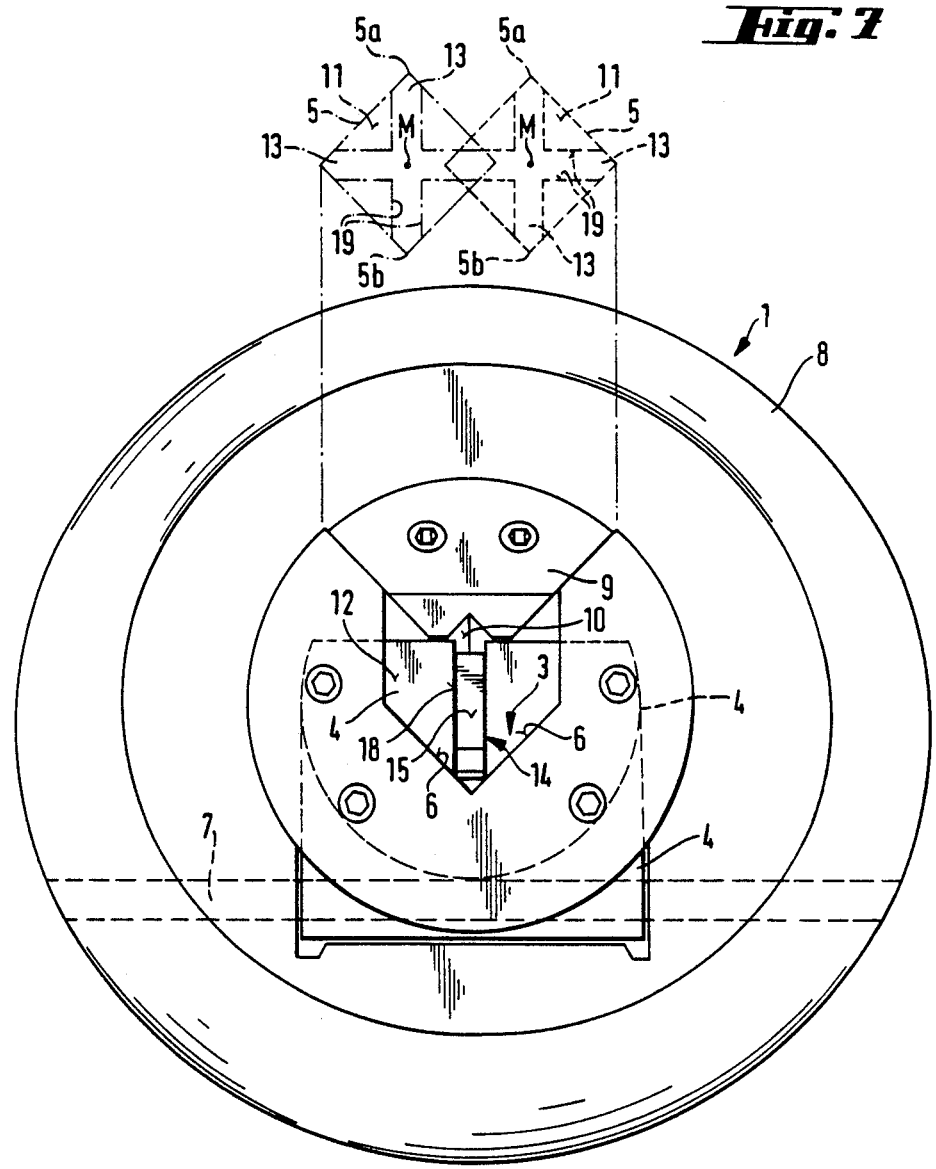
FIG. 7 is a transverse sectional view of a third coupling wherein the end face of the end portion of the driven member has a female component including two intersecting open-ended grooves.

An advantage of a female component having a groove 13 which extends all the way across the end face 11 of the end portion 5A of the mandrel 5 is that the mandrel can be properly coupled with the shaft 2 in two different angular positions, namely in the position which is shown in FIG. 1 (in which the edge 5a is disposed at a level above the edge 5b) and in a second position in which the positions of the edges 5a and 5b are reversed. The versatility of the coupling 1 can be enhanced still further if the end face 11 of the end portion 5A is provided with two mutually inclined intersecting grooves 13 (see FIG. 7) each of which has two open ends, namely in the regions of the respective edges between the facets 5c of the peripheral surface of the end portion 5A. This renders it possible to properly insert the end portion 5A into the space between the surface portions 6 of the socket 4 in any one of four different angular positions. Each of the grooves 13 extends diagonally across the square end face 11 of the end portion 5A which is shown in FIG. 7. FIG. 7 further shows that the width of the male component 14 of the torque transmitting means matches or closely approximates the width of a groove 13 so that the torque transmitting means including the female component having the grooves 13 and the male component including the tongue 14 can transmit torque without any wobbling of the end portion 5A relative to the shaft 2 and/or vice versa.

The surface portions 6 of the socket 4 will automatically center the end portion 5A in proper position relative to the male component 14 regardless of whether the end portion 5A descends from the phantom-line or from the broken-line position of FIG. 7. At such time, the hand wheel 8 is held in the inoperative position but can be pivoted back to the operative position as soon as the edge 5b of the end portion 5A enters the lowermost region of that part of the composite socket 3 which is flanked by the surface portions 6 of the socket 4.

In order to avoid damage to the torque transmitting means if the end portion 5A of the mandrel 5 is not maintained in proper orientation during insertion into that part of the recess 3 which is defined by the socket 4 of the end portion of the shaft 2, the tongue 14 is preferably yieldably mounted on or in the end portion of the shaft 2. This is achieved by the provision of the aforementioned pivot member 20 which enables the tongue 14 to pivot about an axis (A) extending transversely of the axis M—M. Such torque transmitting means further comprises means for biasing the tongue 14 to the position which is shown in FIG. 1 and in which the rightmost portion of the tongue projects into the aligned groove 13 in the end face 11 of the end portion 5A. The biasing means comprises a coil spring 16 which is installed in an eccentric blind bore or hole 17 in the socket 4. The purpose of the coil spring 16 is to permanently bias the tongue 14 in a counterclockwise direction, as seen in FIG. 1. The ramp 15 is engaged by the end face 11 of the end portion 5A during insertion of the end portion 5A into that part of the recess 3 which is defined by the socket 4 if the orientation of the end portion 5A during insertion into the socket 4 is not satisfactory, namely if the edge 5b is not located exactly below the edge 5a or vice versa. The inclination of the ramp 15 of the tongue 14 need not be very pronounced, a long as it suffices to ensure that the tongue can yield in response to introduction of an improperly oriented end portion 5A into that part of the recess 3 which is defined by the socket 4 of the shaft 2. The spring 16 stores energy during pivoting of the tongue 14 in a clockwise direction and is permitted to dissipate energy so as to propel the ramp 15 into the groove 13 as soon as the end portion 5A is properly received in the socket 4. The ramp 15 could extend all the way between the uppermost and the lowermost portions of the tongue 14; however, it is normally sufficient if the ramp 15 is provided on that portion or arm 14a of the tongue 14 which is located at a level below the axis A of the pivot member 20, as seen in FIG. 1. Of course, the spring 16 need not be deformed beyond its initial stressing (if any) and need not store any additional energy if the orientation of the shaft 2 and of the mandrel 5 during introduction of the end portion 5A into the socket 4 is proper, namely if the edges 5a and 5b are located in a vertical plane and the surface portions 6 of the socket 4 meet along an edge which is located in a vertical plane including the axis M—M. If the orientation of the end portion 5A is different, insertion of the end portion 5A into the space between the surface portions 6 entails a change of angular position of the shaft 2 and/or a change of angular position of the mandrel 5 so as to allow the lower two facets 5c of the end portion 5A to penetrate into full contact with the surface portions 6 of the socket 4. The tongue 14 has a suitably configured protuberance 14b which can extend into the blind bore 17 of the socket 4 in order to engage the outermost convolution of the coil spring 16. The surface portions 6 of the socket 4 perform a desirable centering action which ensures that the orientation of the end portion 5A and/or shaft 2 is changed if the orientation of the end portion 5A during introduction into the socket 4 is improper. As mentioned above, the orientation of the shaft 2 during introduction of the end portion 5A into the socket 4 is preferably such that the axis M—M and the line where the surface portions 6 of the socket 4 intersect each other are located in a common vertical plane. This necessitates such orientation of the end portion 5A that the edges 5a and 5b are located in a common vertical plane during insertion of the end portion 5A into the socket 4. Once the end portion 5A is properly received in the socket 4, the hand wheel 8 is pivoted about the axis of the pivot member 7 so as to move from the phantom-line position to the solid-line position of FIG. 1 and to thus ensure that the end portion 5A is properly held in the composite recess 3 which is defined by the sections 8 and 4 of the end portion of the shaft 2. At such time, the torque transmitting means 13, 14 already establishes a proper torque-transmitting connection between the socket 4 and the end portion 5A.

The tongue 14 of the torque transmitting means can be laminated; e.g., it can comprise two plate-like portions which are bonded or otherwise secured to each other side-to-side to reinforce the tongue. The pivot member 20 can comprise a rivet with two rivet heads which are received in complementary concave sockets 21 of the socket 4. The surfaces 22 bounding the slot which is provided in the bottom face 12 of the socket 4 for the major part of the tongue 14 guide the tongue so that the latter is confined to pivotal movements about the axis A of the rivet 20. The surfaces 19 bounding a portion of the groove 13 are in register with the surfaces 22 in the slot of the socket 4 when the end portion 5A is properly received in the socket 3 (this can be seen in FIG. 4). The lateral surfaces 18 of the tongue 14 are parallel to the surfaces 22 and 19 when the tongue 14 (and more particularly its ramp 15) is free to enter the groove 13 in the end face 11 of the end portion 5A. The surfaces 18 and 19 cooperate to transmit torque from the shaft 2 to the mandrel 5 if the shaft 2 is started before the hand wheel 8 is pivoted to its operative position but after the end portion 5A of the mandrel 5 is properly received in that part of the recess 3 which is defined by the socket 4.

Figure 4:
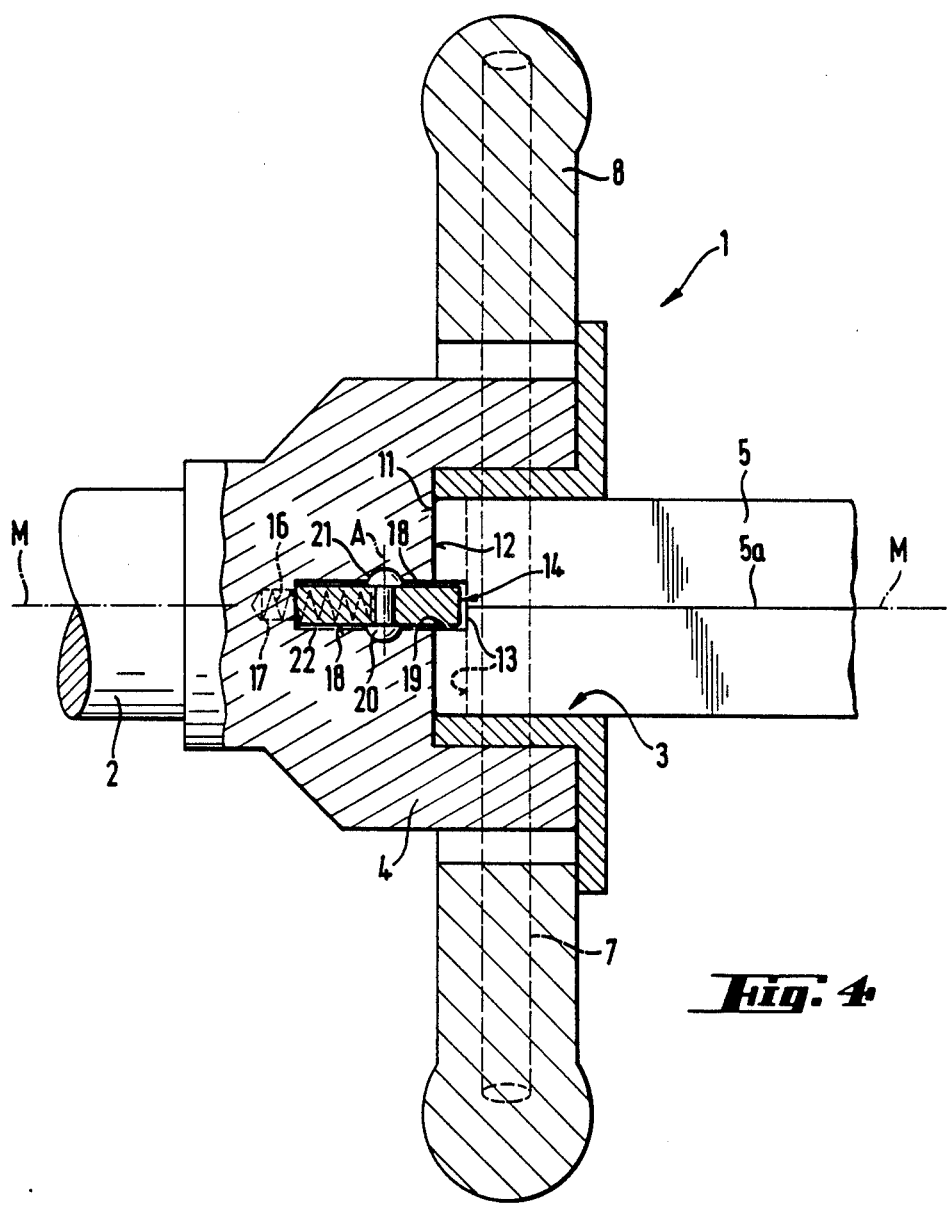
FIG. 4 is a larger-scale sectional view, substantially as seen in the direction of arrows from the line IV—IV of FIG. 2.

The rivet 20 can be moved to the positions of FIG. 4 through a slot 21 which has an open end and is provided in the socket 4 of the end portion of the shaft 2. The protuberance 14b of the tongue 14 maintains the latter in the proper position together with the rivet 20 once the rivet 20 is free to snap into the sockets 21. The just described mode of mounting the tongue 14 in the socket 4 has been found to be very simple and the tongue is reliably held in proper position in which its ramp 15 can be engaged by the end portion 5A if the orientation of the end portion 5A during its introduction into the socket 4 deviates from an optimum orientation.

Figure 5:
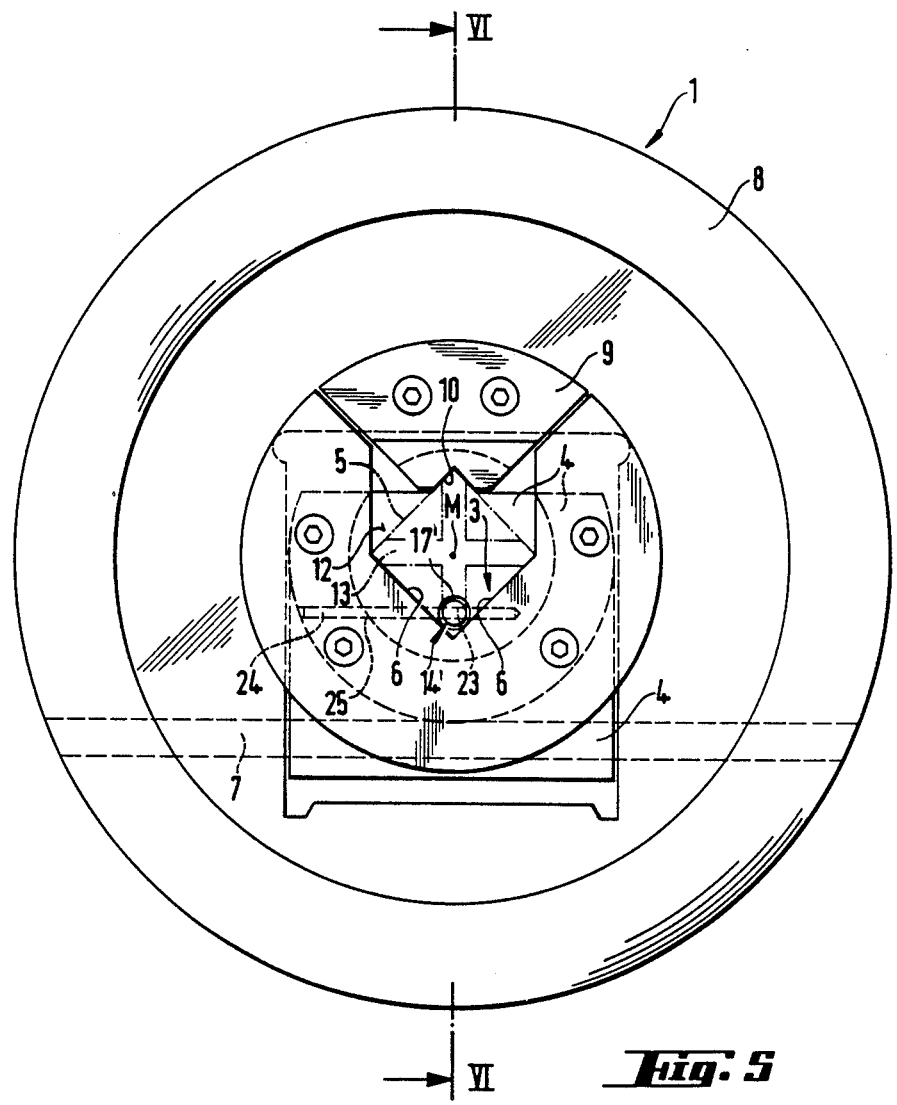
FIG. 5 is a transverse sectional view of a modified coupling wherein the torque transmitting means has a reciprocable male component.
Figure 6:
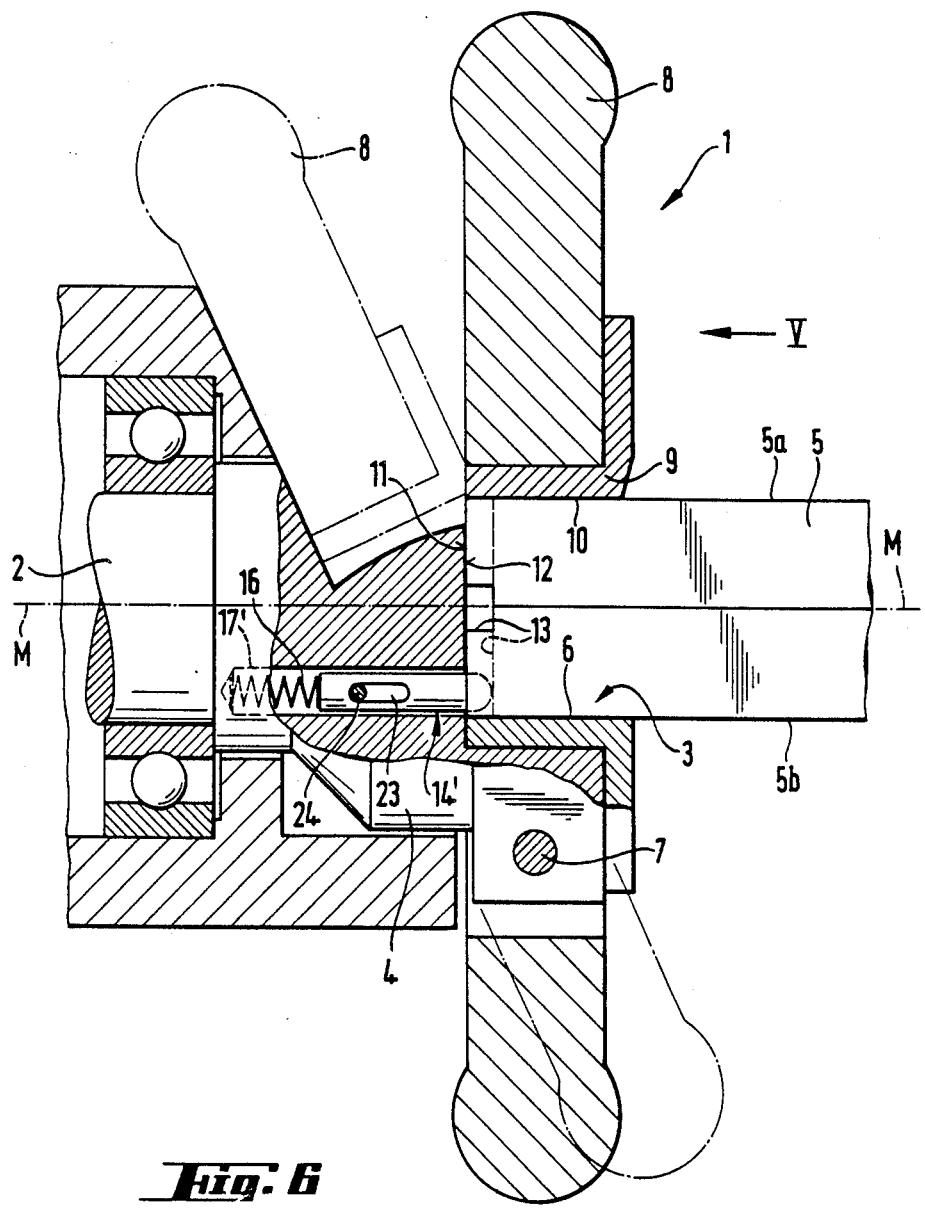
FIG. 6 is an enlarged sectional view as seen in the direction of arrows from the line VI—VI of FIG. 5.

FIGS. 5 and 6 show a modified coupling 1 which deviates from the coupling 1 of FIGS. 1-4 in that the male component of the torque transmitting means is a reciprocable stud 14 mounted in an axially parallel blind bore or hole 17 of the socket 4. The stud 14' is biased in a direction to the right, as seen in FIG. 6, by a coil spring 16 which is inserted into the deepmost portion of the blind bore or hole 17'. The means for limiting the extent of reciprocatory movement of the stud 14' relative to the socket 4 comprises a protuberance in the form of a pin 24 provided on the socket 4 and extending into an elongated closed slot 23 of the stud 14'. The exposed end portion of the stud 14' is rounded, bevelled or otherwise configured in such a way that it can be readily engaged by the end face 11 of the end portion 5A of the mandrel 5 if the orientation of such end portion during introduction into that part of the recess 3 which is defined by the socket 4 is improper. The stud 14' is closely adjacent the junction of surface portions 6 in the socket 4, i.e., the stud 14' is distant from the axis M—M so as to ensure that it can transmit a substantial torque as soon as it has penetrated into the groove 13 which is machined into the end face 11 of the end portion 5A. The function of the rounded end portion of the stud 14 is analogous to that of the ramp 15 of the pivotable male component or tongue 14 in the embodiment of FIGS. 1–4.

FIG. 5 shows that the pin 24 is inserted into a bore 25 which is provided in the socket 4 and has an open end so that the pin 24 can be inserted or withdrawn when necessary. The axis of the bore 25 extends at right angles to the axis of the blind bore 17' for the stud 14'.

An important advantage of the embodiment which is shown in FIGS. 5 and 6 is that the bores 17' and 25 can be machined into or otherwise formed in the socket of an existing coupling so as to enable such coupling to be provided with the improved torque transmitting means. All that is necessary is to provide the end face 11 of the end portion 5A with one or more grooves 13, to machine the blind bore 17' into the bottom face 12 of the socket 4, and to provide the socket with a bore (25) for of the pin 24.

The embodiment which is shown in FIG. 8 differs from the embodiment of FIGS. 1–4 in that the end portion 5A' of the mandrel has a peripheral surface including a facet or flat 105A' and a cylindrical portion 105B'. In addition, the tongue-like male component 14" of the torque transmitting means is provided on the end portion 5A' and extends from the end face 12'. The socket 4' of the shaft which forms part of the coupling of FIG. 8 is provided with a bottom face 12' which is disposed in the deepmost part of the recess and is formed with a groove 13' having an upwardly facing open end 13A' when the socket 4' is ready to receive the lower part of the end portion 5A' of the mandrel. At such time, the tongue 14" automatically enters the groove 13' and the tongue then cooperates with the surfaces bounding the groove 13' to transmit torque from the shaft to the mandrel regardless of whether the hand wheel (not shown in FIG. 8) is or is not held in its operative position. It will be noted that the tongue 14" is eccentric with reference to the axis of the mandrel including the end portion 5A' of FIG. 8.

The improved coupling can be modified in a number of additional ways without departing from the spirit of the invention. For example, the end portion 5A' of the mandrel of FIG. 8 can have a fully circular cross-sectional outline if the tongue 14" is sufficiently strong to transmit torque from the shaft to the mandrel so that no torque transmission must take place between the peripheral surface of the end portion of the mandrel and the surface surrounding the recess in the end portion of the shaft. This will contribute to lower cost of the coupling because it is much simpler to provide the end portion 5A or 5A' of the mandrel with a truly cylindrical peripheral surface.

An important advantage of the improved coupling is that the shaft can be started (for example, accidentally) even before the hand wheel 8 is pivoted back to its operative position. This does not entail any damage to the coupling and/or to the other parts of the apparatus which embodies the coupling. The reason is that the torque transmitting means (such as 13, 14) can properly rotate the mandrel regardless of whether or not the hand wheel 8 is held in the operative position. This is due to the fact that the torque transmitting means operates between the end face of the end portion of the mandrel and the bottom face in the composite recess 3 in the end portion of the shaft 2. There is no need to provide automatic means for returning the hand wheel 8 to its operative position in response to starting of the shaft 2 and/or for the provision of automatic means for preventing rotation of the shaft 2 before the hand wheel 8 is returned to its operative position.

Another important advantage of the improved torque transmitting means is that it automatically maintains the end portion 5A or 5A' in an optimum position for reception of torque from the end portion 4, 8 or 4', 8 of the shaft 2. This is due to the fact that the surfaces bounding the recess 3 automatically guide the end portion 5A or 5A' to a position in which the male component 14, 14' or 14" can snap into the single groove or into one of several grooves in the end face of the end portion 5A (FIGS. 1–6) or in which the male component 14" at the end face 11' of the end portion 5A' can penetrate into the groove 13' in the bottom face 12' of the socket 4'.

A further important advantage of the improved coupling is that it accomplishes a plurality of apparently contradictory objects, such as enabling the shaft 2 to rotate the mandrel before the hand wheel 8 is moved back to its operative position (i.e., before the mandrel is properly locked in a position of exact axial alignment with the shaft 2), and preventing any damage to the coupling and/or to other parts of the apparatus in which the coupling is put to use.

While it is also possible to mount the improved torque transmitting means in positions other than at the end face of the end portion of the mandrel and at the bottom face of the socket 4 or 4', such positioning of the improved torque transmitting means is preferred at this time because the torque transmitting means does not generate forces which would tend to shift the end portion 5A or 5A' laterally of the end portion 4, 8 or 4', 8 of the shaft 2. It has been found that the improved torque transmitting means can properly rotate the mandrel in the absence of (a) any means for automatically returning the hand wheel 8 to its operative position upon completed insertion of the end portion 5A or 5A' into the socket 4 or 4' and/or (b) any means for automatically preventing rotation of the shaft 2 before the hand wheel 8 reassumes its operative position. The coupling can be used with advantage even if the end portion 5A or 5A' has a conical or substantially conical outline. In other words, it is immaterial whether or not the end portion 5A or 5A' tapers in a direction from the major part of the mandrel toward the bottom face 12 or 12' in the composite recess 3.

Still another advantage of the improved coupling is that the transmission of torque between the shaft 2 and the mandrel takes place along two discrete paths, namely by way of the internal surface surrounding the recess 3 in the operative position of the hand wheel 8, and by way of surfaces on the male component 14 and the adjacent surfaces in the corresponding groove 13 in the end face 11 of the end portion 5A or vice versa. In other words, transmission of torque in a properly assembled coupling takes place by way of the peripheral surface of the end portion 5A or 5A' as well as by way of the end face 11 or 11' of such end portion. This contributes to a reduction of wear upon the peripheral surfaces of the end portion 5A or 5A' and the adjacent internal surfaces of the end portion 4, 8 or 4', 8 in the recess.

The provision of a male component which fills or nearly fills the corresponding groove 13 or 13' is desirable and advantageous because such torque transmitting means can transmit a substantial torque in immediate response to starting of the shaft 2 and regardless of the momentary position of the hand wheel 8.

The provision of one or more grooves 13 or 13' with open ends is desirable and advantageous because this allows for insertion of the end portion 5A or 5A' from one side of the end portion of the shaft. In other words, it is not necessary to move the end portion 5A or 5A' axially during insertion into that part of the recess 3 which is defined by the socket 4 or 4' of the end portion of the shaft 2.

The provision of one or more grooves 13 or 13' which extend all the way across the end face 11 or bottom face 12' is desirable and advantageous because this simplifies the making of the groove or grooves and facilitates the introduction of the male component (a tongue or a stud) into such groove during insertion of the end portion 5A or 5A' into the socket 4.

While FIGS. 1 to 6 show an end portion 5A which has a polygonal outline, it is also possible (see FIG. 8) to provide the mandrel with an end portion which has a more complex outline, for example a partly cylindrical and partly polygonal outline as shown in FIG. 8. All that counts is to ensure that the peripheral surface of the properly inserted end portion 5A or 5A' can receive torque from the end portion of the shaft 2 when the shaft is rotated in addition to such torque which is transmitted by way of the improved torque transmitting means. An end portion (such as 5A or 5A') having a square cross-sectional outline is preferred in many types of winding and unwinding apparatus.

The provision of a male torque transmitting component which is movable relative to the respective end portion (either by being pivotably or by being reciprocably mounted in the respective end portion) is desirable and advantageous but optional. Such mounting of the male component renders it possible to ensure that the male component penetrates into the complementary female component even if the end portion 5A or 5A' is not introduced into the socket 4 or 4' in an optimum (prescribed) orientation. The male component then yields during introduction of the end portion 5A or 5A' into the respective socket 4 or 4' but the spring 16 ensures that the male component invariably penetrates into the adjacent groove 13 or 13' as soon as the end portion 5A or 5A' has fully entered the socket 4 or 4'. As mentioned before, the configuration of the surfaces bounding that part of the recess 3 which is defined by the socket 4 or 4' is preferably such that the end portion 5A or 5A' is automatically guided toward its optimum centered position on its way into the socket 4 or 4'.

As mentioned above, the torque transmitting means of FIGS. 5 and 6 exhibits the important advantage that it can be incorporated into existing couplings with a minimum of cost and loss of time. The placing of the male coupling element in such position that the portion which is to enter the adjacent groove 13 or 13' is remote from the axis M—M is desirable and advantageous because such torque transmitting means can transmit substantial torque in immediate response to starting of the shaft 2. In other words, the lever arm of the male component of the torque transmitting means should be as large as possible.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling comprising a rotary driving member having a first end portion; a rotary driven member having a second end portion, one of said end portions having first and second sections and said first section being movable relative to said second section between a first position in which said first and second sections respectively define first and second parts of a recess and a second position in which the second part of said recess is accessible at one side of said one end portion, the other of said end portions being insertable into and removable from the second part of said recess at the one side of said one end portion in the second position of said first section, said other end portion having a noncircular peripheral surface and said one end portion having a substantially complementary internal surface surrounding said recess in the first position of said first section so that said driving member can rotate said driven member by way of said surfaces; and means for transmitting torque between said end portions in either rotary direction and independently of said surfaces and irrespective of the position of said first section as long as the other end portion is inserted into the second part of said recess.

2. The coupling of claim 1, wherein said other end portion has an end face and said one end portion has a bottom face in said recess, said torque transmitting means comprising a first component in the region of said end face and a second component in the region of said bottom face.

3. The coupling of claim 2, wherein said bottom face is provided on said second section.

4. The coupling of claim 1, wherein said torque transmitting means comprises a female component in one of said faces and a male component extending beyond the other of said faces and into said female component when said other end portion is received in the second part of said recess.

5. The coupling of claim 4, wherein said female component has a groove extending substantially radially of the respective end portion and said male component has a tongue.

6. The coupling of claim 5, wherein said groove has an open end at said one side of said one end portion and said tongue is eccentric with reference to said respective end portion.

7. The coupling of claim 4, wherein said female component has a groove in said end face and said male component has a tongue extending beyond said bottom face and into said groove when said other end portion is received in the second part of said recess.

8. The coupling of claim 7, wherein said peripheral surface has two mutually inclined facets defining an edge and received in the second part of said recess, said groove having an open end in the region of said edge.

9. The coupling of claim 4, wherein said female component has a groove in said one face and said male component has a tongue extending beyond said other of said faces and into said groove when said other end portion is received in the second part of said recess.

10. The coupling of claim 9, wherein said peripheral surface has a flat and a substantially cylindrical portion, said groove having an open end at that one side of said one end portion.

11. The coupling of claim 9, wherein said tongue is eccentric with reference to said other end portion.

12. The coupling of claim 4, wherein said female component comprises an elongated groove extending across the entire end face of said other end portion and having two open ends.

13. The coupling of claim 4, wherein said female component has a plurality of intersecting grooves in the end face of said other end portion.

14. The coupling of claim 13, wherein said peripheral surface has a plurality of facets defining a plurality of edges and each of said grooves has an open end in the region of a different one of said edges.

15. The coupling of claim 14, wherein said end face has a substantially square outline bounded by four facets and four edges, said female component having two grooves extending diagonally of said end face and each having two open ends.

16. The coupling of claim 4, wherein said male component at least substantially fills said female component when said other end portion is received in the second part of said recess.

17. The coupling of claim 4, further comprising means for movably mounting said male component in the respective end portion so that said male component can yield during insertion of said other end portion into the second part of said recess.

18. The coupling of claim 17, further comprising means for biasing said male component into said female component when said other end portion is received in the second part of said recess.

19. The coupling of claim 18, wherein said mounting means comprises a pivot member extending transversely of the axis of the respective end portion and said biasing means comprises at least one resilient element reacting against the respective end portion and bearing against said male component.

20. The coupling of claim 19, wherein said pivot member has an axis which intersects or is closely adjacent the axis of the respective end portion.

21. The coupling of claim 20, wherein said male component has a ramp which slopes in a direction away from the one side of said one end portion and is acted upon by the other end portion during insertion of said other end portion into the second part of said recess when the direction of insertion of said other end portion deviates from a predetermined direction.

22. The coupling of claim 17, wherein said mounting means comprises at least one ball and socket joint and the end portion in which said male component is movably mounted comprises guide means confining said male component to movements along a predetermined path.

23. The coupling of claim 22, wherein said ball and socket joint comprises two rivet heads on said male component and two complementary sockets in the respective end portion.

24. The coupling of claim 17, wherein said male component is reciprocably mounted in the respective end portion eccentrically of such end portion, and further comprising means for biasing said male component into said female component when said other end portion is received in the second part of said recess.

25. The coupling of claim 24, wherein said male component has a rounded or bevelled tip which penetrates into said female component in response to proper insertion of said other end portion into the second part of said recess.

26. The coupling of claim 24, further comprising means for limiting the extent of reciprocability of said male component relative to the respective end portion.

27. The coupling of claim 26, wherein said male component has an elongated slot and said limiting means comprises a projection provided on the respective end portion and extending into said slot.

28. The coupling of claim 24, wherein said male component is remote from the axis of the respective end portion and from the one side of said one end portion when said other end portion extends into the second part of said recess.

29. The coupling of claim 28, wherein said other end face has a hole for said male component, said hole being substantially parallel to the axis of the respective end portion.

* * * * *